United States Patent [19]

Willmore

[11] Patent Number: 4,581,042

[45] Date of Patent: Apr. 8, 1986

[54] COMPOSITION FOR REMOVING HARD-WATER BUILD-UP

[75] Inventor: George A. Willmore, Rexburg, Id.

[73] Assignee: Pro-Strength, Inc., Rexburg, Id.

[21] Appl. No.: 624,471

[22] Filed: Jun. 22, 1984

[51] Int. Cl.$^4$ .............................................. B24D 17/00
[52] U.S. Cl. ........................................ 51/293; 51/307;
106/3; 134/3; 252/174.14
[58] Field of Search ...................... 51/293, 307; 106/3;
252/174.14, 80, 86, 87; 134/3, 42

[56] References Cited

U.S. PATENT DOCUMENTS

| | | | |
|---|---|---|---|
| 2,672,449 | 3/1954 | Snell et al. | 252/100 |
| 4,270,932 | 6/1981 | Perovetz et al. | 51/293 |
| 4,279,768 | 7/1981 | Busch | 252/80 |
| 4,370,173 | 1/1983 | Dollman | 134/40 |
| 4,435,303 | 3/1984 | Abadi | 252/87 |
| 4,460,479 | 7/1984 | Mulder | 252/87 |

*Primary Examiner*—Paul Lieberman
*Assistant Examiner*—Willie J. Thompson
*Attorney, Agent, or Firm*—Berman, Aisenberg & Platt

[57] ABSTRACT

A composition for a hard-water build-up remover that comprises an abrasive, an acid, a surfactant, a suspending material and water; and a method for producing said composition that comprises pouring hot water into a mixing tank and slowly adding the suspending material; allowing the water and suspending material to mix for one hour, then adding the acid, the abrasive and the surfactant into the mixing tank.

22 Claims, No Drawings

COMPOSITION FOR REMOVING HARD-WATER BUILD-UP

TECHNICAL FIELD

This invention relates to a composition for cleaning and removing hard-water deposits often found in the home on surfaces, such as glass and tile. The composition is an admixture of an abrasive, a surfactant, an acid, a suspending material and water.

BACKGROUND

There has been a longstanding need for a simple and effective means to remove hard-water deposits from many surfaces, such as windows, chrome, shower doors, tubs, sinks and fixtures. Available products designed for this purpose are either of industrial strength (thus dangerous to use unless proper precautions are observed), or do not effectively aid in the cleaning of hard-water build-up without substantial effort by whoever is charged with the task. In addition, there is a problem of retaining such products on a vertical surface in a film of sufficient thickness and body to clean the surface.

A thixotropic gel cleaning product (metal cleaner) is described in U.S. Pat. No. 2,672,449. That thixotropic gel is designed to clean oxide deposits from a metal surface. It does not rinse well with water and its safety for household use is regarded as at least questionable. The recommended Triton surfactant requires great care when it is used. The gel also contains bentonite as a mild abrasive and polishing agent. However, bentonite does not have enough abrasive power to clean and polish surfaces having hard-water deposits. The bentonite is also used for its gel forming properties; if another material were substituted for the bentonite, in regard to abrasive purposes, the entire cleaning gel composition would have to be redesigned.

SUMMARY OF THE INVENTION

Compositions of this invention clean and remove deposits of hard-water build-up from glass, tile and other surfaces. An object of this invention is to produce a product that is safe for household use and still effectively removes hard-water build-up. A further object is to obtain a product that rinses off well with water. A still further object is to clean and remove deposits of hard-water build-up from glass and tile and other surfaces around the house without scratching or damaging such surfaces. Another object is to provide a simple method, using easily obtainable components, to produce a hard-water build-up remover. It is also an object of this invention to provide a substance (for removing hard-water build-up) that maintains a sufficient thickness on vertical walls to clean the walls properly. A still further object is to clean and remove deposits of hard-water build-up with minimal effort and without leaving a film.

In the practice of this invention, the hard-water build-up remover is produced by first pouring hot water into a mixing tank. A suspending material (0.1 percent to 2 percent by weight), such as Kelzan (xanthan gum), agar-agar, gelatin, bentonite, gelloid (calcium carragheen sulfate) and acrysol ICS-1 thickener, is then added very slowly to the hot water. The hot water and the suspending material are then admixed for one hour. After that time from 0.5 to 15 percent by weight of abrasive, such as pumice, carborundum (silicon carbide), diatomaceous earth, boron carbide, silica (silicon dioxide), corundum (aluminum oxide), feldspar, rouge (iron oxide) and bentonite (in the form of powder having a particle size ranging from 45 to 300 microns) is added into the mixing tank. From 4 to 70 percent by weight of acid (having a concentration of from 5 to 30 percent by weight), such as phosphoric acid, acetic acid, hydroacetic acid, citric acid, formic acid, chloric acid, bisulfate salts, chlorous acid, sulfamic acid and tartaric acid, is then added to the mixing tank. From 0.1 to 12 percent by weight of preferably anionic or nonionic surfactant, such as Dowfax 2A1, Ninex 24 and Dowfax 3B2, is subsequently added to the mixing tank. The resulting composition is a hard-water build-up remover which is an object of this invention.

To remove hard-water build-up from a portion of a surface containing same, a substantially homogeneous and stable thixotropic aqueous composition (in which a finely-divided abrasive is dispersed throughout and suspended in a colloid) is placed on a suitable applicator with which the portion is rubbed. The composition is preferably easily and completely water rinsable so that it does not leave any film.

OTHER PROPERTIES

The abrasive is preferably pumice or diatomaceous silica. The finer the particle size, the better. The particle size of the abrasive should not exceed 300 microns. Particles of abrasive should not adhere to each other or agglomerate in aqueous suspension. Xanthan gum is excellent in helping to achieve this result and to obtain a stable aqueous suspension of abrasive particles.

The shelf life (stability) of compositions of this invention is at least six months (preferably, at least one year) when maintained in liquid state.

All that is required of the surfactant is compatibility. Anionic and nonionic surface active agents are generally compatible. The surfactant acts as an acid for suspending particulates in the formulation and for cleaning surfaces to which composition is applied.

The density of contemplated compositions is generally in the range of from 1.070 to 1.090; that of preferred embodiments is about 1.084.

The water miscibility of these compositions is very good—about 2.5 on a scale of 1 to 10, wherein 10 is immiscible; compositions lower on the scale do not adhere to a vertical surface. The compositions have 100 percent rinsability.

The Brookfield viscosity is about 4200 centipoises (torque of a spinning cylinder in a static liquid).

Although the acid is advantageously acetic acid, hydroacetic acid or formic acid, phosphoric acid is far preferred. The acid reacts with calcium carbonate or magnesium carbonate build-up and is a significant part of the formulation. Whichever of the enumerated acids is/are employed, the composition additionally advantageously contains from about 0.3 to 15 percent hydrochloric acid, which is incorporated in the formulation with the rest of the included acid. The composition has a pH in the range of from 0.8 to 1.5, preferably about 1.0.

Xanthan gum is particularly good as a thickener for and as importing thixotropic properties to the admixture. It gives the composition a gel consistency (at rest) and allows it to flow (liquefy) when agitated; it returns to a gel form after agitation ceases. This allows the mixture to be spread evenly over a vertical surface, such as glass or tile, and to remain in place thereon for a period of time long enough to react with hard-water residue. The thixotropic characteristics of the composition allow it to flow slowly down over a vertical surface. The acid in the admixture is thus in contact with the carbonate residue in any hard-water deposit long enough to react therewith and make such deposit susceptible to removal with light scrubbing and concommitant contact with the abrasive particles. The combination removes the residue and polishes the surface.

Even though bentonite is both a suspending agent and an abrasive, extremely good compositions are formulated without any bentonite.

SPECIFIC EMBODIMENT

The preparation of hard-water build-up remover comprises initially pouring 78.4 percent by weight of hot water into a mixing tank and then very slowing adding from 0.1 to 2 (preferably 0.8) percent by weight of Kelzan (xanthan gum). The hot water and the Kelzan are then allowed to mix for 1 hour. At the end of the hour, from 0.5 to 15 (preferably 7) percent by weight of pumice, from 4 to 70 (preferably 13.6) percent by weight of phosphoric acid and from 0.1 to 12 (preferably 0.2) percent by weight of Dowfax 2A1 surfactant (dodecyldiphenylether disulfonic acid, sodium salt) are added into the mixing tank that contains the Kelzan and hot water.

To remove hard-water build-up, the resulting composition is applied to the rough surface of a scrubbing pad. The pad with the composition is then applied in a circular motion to the surface to be cleaned. After cleaning, any excess composition is removed with water and a damp cloth. The hard-water build-up remover removes hard-water deposits and thus cleans glass, tile and other surfaces containing such deposits.

A description of the preferred components of the composition are as follows. Kelzan (xanthan gum) is a natural high-molecular weight branched polysaccharide. It has excellent suspending properties for hard to suspend solids, such as pumice. The Kelzan forms a hydrophilic colloid that thickens the mixture and suspends the pumice. The mixture shows extreme pseudoplasticity (high viscosity under low shear, but low viscosity under high shear).

Pumice is a light, spongy stone that is used for cleaning, smoothing and polishing and is a strong abrasive. The abrasive properties are strong enough to clean and polish surfaces that have hard-water build-up. However, pumice does not damage or scratch these surfaces. It is a volcanic mineral (lava froth) which is chemically inert and consists mainly of aluminum silicate. It has no affinity for water. Pumice is not a componenet of the colloid, but is suspended in the colloid that is formed by the Kelzan. When the pumice is added into the mixing tank to produce the hard-water build-up remover, it must be powdered and have a particle size ranging between 45 microns and 300 microns.

The phosphoric acid aids in the cleansing process. When it is added into the mixing tank to form the hard-water build-up remover, it should be in an acid solution that ranges in concentration from 5 to 30 percent by weight.

The Dowfax 2A1 surfactant helps to stabilize the emulsion. The Dowfax 2A1 surfactant is an anionic surface active agent based on the disulfonated diphenyl oxide molecule. It is an alkylated diphenyl oxide disulfonate and there is a twelve carbon branched hydrophobe attached to the diphenyl oxide backbone. It is the sodium salt of the Dowfax 2A0 surfactant, and is shown to be 45 percent active. All of these components mix together to form the hard-water build-up remover that is safe for household use (when proper caution is observed) and rinses off well with water.

The invention and its advantages are readily understood from the foregoing description. Various changes may be made in the process and in the products without departing from the spirit and scope of the invention or sacrificing its material advantages. The described process and products are merely illustrative of preferred embodiments of the invention.

What is claimed is:

1. A substantially homogeneous thixotropic aqueous bentonite-free composition useful for removing hard-water build-up from a surface and having storage stability of at least about 6 months over its normally-liquid temperature range, the composition comprising a colloid and having the following properties:
    density: 1.070 to 1.090
    pH range: 0.8 to 1.5
    viscosity: 4200 cp at rest
    thixotropy: has a gel-like consistency, adheres to a vertical surface and liquefies readily, easily water-rinsable (without leaving a film) from a surface to which it has been applied,
and comprising
    (a) from 0.5 to 15 percent by weight of abrasive which is suspended in, but not an essential component of, the colloid, the abrasive being one which is selected from a group such as pumice, carborundum, boron carbide, silica, corundum, and feldspar,
    (b) from 4 to 70 percent by weight of acid,
    (c) from 0.1 to 2 percent by weight of suspending agent,
    (d) from 0.1 to 12 percent by weight of surfactant other than the suspending agent and
    (e) substantially the rest, water;
    the abrasive, when uncombined, being in powder form and having a particle size of at most 300 microns; and
    the acid having a concentration of from 5 to 30 percent by weight in the final composition.

2. A composition according to claim 1 wherein the abrasive comprises pumice.

3. A composition according to claim 1 wherein the abrasive has a particle size of from 45 to 300 microns.

4. A composition according to claim 3 wherein the acid comprises phosphoric acid.

5. A composition according to claim 3 wherein the acid comprises a member selected from the group consisting of phosphoric acid, acetic acid, hydroacetic acid, citric acid, formic acid, chloric acid, a bisulfate salt, oxalic acid, chlorous acid, sulfamic acid and tartaric acid.

6. A composition according to claim 5 wherein the suspending agent comprises xanthan gum.

7. A composition according to claim 5 wherein the suspending agent comprises a member selected from the group consisting of xanthan gum, gum arabic, gum tragacanth, carob bean gum, guar gum, karaya gum, gum Ghatti, agar, gelatin, carrageenan and polyacrylate.

8. A composition according to claim 7 wherein the surfactant comprises a salt of dodecyldiphenylether disulfonic acid.

9. A composition according to claim 7 wherein the surfactant comprises an anionic, cationic or nonionic surfactant.

10. A composition according to claim 7 wherein the surfactant comprises a member selected from the group consisting of an alkyl sulfate, an alkyl aryl sulfonate, an alkyl phenol ethoxylate, a fatty alcohol ethoxylate, a sulfated nonionic ethoxylate and a quaternary salt.

11. A composition according to claim 1 which comprises about 0.3 to 15 percent of hydrochloric acid.

12. A composition according to claim 1 which comprises:
(a) from 0.5 to 15 percent by weight of abrasive,
(b) from 4 to 70 percent by weight of phosphoric acid,
(c) from 0.1 to 2.0 percent by weight of xanthan gum,
(d) from 0.1 to 12 percent by weight of an anionic surface active agent based on a disulfonated diphenyl oxide and
(e) enough water to make up 100 percent by weight.

13. A composition according to claim 12 which comprises from 0.3 to 15 percent of hydrochloric acid.

14. A composition according to claim 13 comprising about 7 percent pumice, about 13.6 phosphoric acid, about 0.8 percent xanthan gum and about 0.2 percent Dowfax 2A1 surfactant, all percentages being by weight.

15. A process for removing hard-water build-up from a portion of a surface which comprises rubbing the portion with a substantially homogeneous and stable thixotropic aqueous composition having a pH in the range of from 0.8 to 1.5 and in which a finely-divided abrasive is dispersed throughout and suspended in a colloid, the abrasive being comprised of particles which are no more than 300 microns in diameter.

16. A process according to claim 15 wherein the composition is easily and completely water rinsable, comprises xanthan gum as its sole essential gel-forming component and has, as its sole essential abrasive, a member selected from the group consisting of pumice and diatomaceous silica.

17. A process according to claim 16 wherein the composition comprises phosphoric acid as predominant acid imparting component.

18. A process according to claim 17 wherein the composition comprises 0.3 percent by weight of hydrochloric acid.

19. A process for removing hard-water build-up from a portion of a surface which comprises rubbing the portion with a substantially homogeneous thixotropic aqueous composition having storage stability of at least about 6 months over its normally-liquid temperature range, the composition comprising a colloid and having the following properties:
density: 1.070 to 1.090
pH range: 0.8 to 1.5
viscosity: 4200 cp at rest
thixotropy: has a gel-like consistency, adheres to a vertical surface and liquefies readily, easily water-rinsable (without leaving a film) from a surface to which it has been applied,
and comprising:
(a) from 0.5 to 15 percent by weight of abrasive which is suspended in, but not an essential component of, the colloid,
(b) from 4 to 70 percent by weight of acid,
(c) from 0.1 to 2 percent by weight of suspending agent,
(d) from 0.1 to 12 percent by weight of surfactant other than the suspending agent and
(e) substantially the rest, water;
the abrasive, when uncombined, being in powder form and having a particle size of at most 300 microns; and
the acid having a concentration of from 5 to 30 percent by weight in the final composition.

20. A process according to claim 19 which comprises removing hard-water build-up from a portion of a glass surface which comprises rubbing the portion with the substantially homogeneous thixotropic aqueous composition.

21. A process according to claim 15 for removing hard-water build-up from a portion of a surface which is a glass surface, a chrome surface, a shower door surface, a tub surface, a sink surface or a fixture surface, the process comprising rubbing the portion with the substantially homogeneous and stable thixotropic aqueous composition.

22. A process according to claim 15 wherein the surface is a glass surface.

* * * * *